Patented Feb. 11, 1930

1,746,717

UNITED STATES PATENT OFFICE

RALPH W. SIMPSON, OF JOLIET, ILLINOIS

ARTIFICIAL SNOW

No Drawing.   Application filed August 24, 1927.   Serial No. 215,257.

This invention relates to artificial snow and its object is the provision of a generally improved artificial snow material having improved properties and adapted for improved and simplified production.

The invention provides a material which may be used for simulating snow in connection with Christmas tree decorations, as well as for window or any other decorations in which a white glistening decorating material is desired.

Heretofore, cotton and mica have been used for this purpose, the cotton to give the body and white effect and the mica to provide the desired glisten. Cotton is objectionable due to its inflammable character and the mica separates from the cotton and is difficult to clean up or remove. For example, where cotton and mica are used to simulate snow about a Christmas tree the inflammable character of the cotton is particularly hazardous where candles are employed on the tree and I find that the mica separates from the cotton and will so lodge itself in a rug and in corners that it is practically impossible to sweep it up.

It is to be understood that the present invention is not to be limited to a particular use or purpose but may be employed as and where suitable or desired.

The material of the present invention is white and fluffy and may be packed or gathered to simulate snow. The material is homogeneous and the glisten is uniform through the material and is not separated in use therefrom.

The invention further provides a generally improved, simplified and inexpensive method or process of producing the material.

To acquaint those skilled in the art with the material and manner of producing the same, I shall now describe a particular embodiment of the invention.

According to the present invention, I prepare a solution of sulphuric acid and water in proportions which will, when suitably heated, dissolve natural gypsum or calcium sulphate and which will produce the white, fluffy material here desired. Where commercial sulphuric acid is employed I find that a solution of about 10% commercial sulphuric acid and about 90% water is suitable for the intended purpose, but it is to be understood that the particular proportions of sulphuric acid and water may be varied widely within the scope of the present invention to provide for the desired dissolution of the calcium sulphate, particularly with variations in the grade or concentration of the sulphuric acid.

Heat is then applied in any suitable or desired manner to raise the temperature of the solution of sulphuric acid and water, this solution being preferably brought to the boiling point and the natural gypsum or calcium sulphate is then added to this heated or boiling solution of sulphuric acid and water, preferably in proportion to saturate or substantially saturate the sulphuric acid and water solution with the gypsum or calcium sulphate. I find that the addition of about 25% calcium sulphate or gypsum to about 75% sulphuric acid and water solution is suitable for the purpose intended, although these proportions may, of course, be varied under the present invention.

The mixture of sulphuric acid and water solution and calcium sulphate is agitated to thoroughly mix the same and then the mixture is passed through a suitable filter to filter out any material that does not go into solution.

The solution of sulphuric acid, water and calcium sulphate is then allowed to cool, preferably slowly and crystallizes into the form of a chemically pure hydrous calcium sulphate ($CaSO_4.2H_2O$). The material is then passed through a suitable filter to filter out or separate the crystals from the liquid and the crystals may be dried in any suitable or preferred manner and are then ready for use.

The cooling is preferably slow to make the crystals large, although the cooling may be faster where smaller crystals are desired. The resulting material has the white glistening appearance of snow and is non-inflammable. The material is white and fluffy and of considerable bulk and may be packed or gathered to simulate snow. The material is homogeneous and the glisten is uniform through the material and is not separated in use therefrom. The material is particularly adapted to be used for decorating purposes and it may be used simply and expeditiously and may be conveniently gathered up after use and may be gathered and packed in different snow simulations.

The material of the present invention may be ground to break up the fluffiness, preferably not so fine that the glisten will be removed or impaired and may then be blown to simulate falling snow, in connection with window decorations, stage or picture productions or wherever else desired.

The dilution of the sulphuric acid gives the desired fluffiness and avoids the caked porous mass formation which commonly results where calcium sulphate is treated with sulphuric acid.

I do not intend to limit the invention to the exact procedure or proportions above outlined, but intend to cover broadly the material as well as the above process which is simple, convenient and relatively inexpensive.

I claim:

1. An artificial snow material consisting of a white fluffy crystalline mass of $$CaSO_4 2H_2O.$$

2. A decorating material consisting of a fluffy crystalline mass of $CaSO_4 2H_2O$.

3. A decorating material consisting of a fluffy, glistening calcium sulphate preparation.

4. A fluffy decorating material formed by treating calcium sulphate in a solution of sulphuric acid and water.

5. The method of producing a decorating material which consists in preparing a solution of sulphuric acid and water with the water in preponderance, heating and adding calcium sulphate to the solution, agitating the mixture, filtering out the insoluble material, slowly cooling to crystallize the calcium sulphate, separating the crystals from the liquid and drying.

6. The method of producing artificial snow which consists in mixing calcium sulphate with a heated solution of sulphuric acid and water with the sulphuric acid and water combined in substantially the proportions of 10% commercial sulphuric acid to substantially 90% water, cooling to crystallize the dissolved calcium sulphate and separating and drying the crystals.

7. The method of producing artificial snow which consists in preparing a solution of substantially 10% sulphuric acid and 90% water, applying heat to bring the solution to the boiling point, adding calcium sulphate in substantially the proportion 25% calcium sulphate to 75% sulphuric acid and water solution, agitating the mixture, filtering out the insoluble material, cooling to crystallize the calcium sulphate, separating the crystals from the liquid and drying the crystalline material.

In witness whereof, I hereunto subscribe my name this 20th day of August, 1927.

RALPH W. SIMPSON.